Oct. 27, 1942. J. K. LUND 2,300,299
THERMOSTAT CONTROLLED VALVE
Filed July 26, 1937
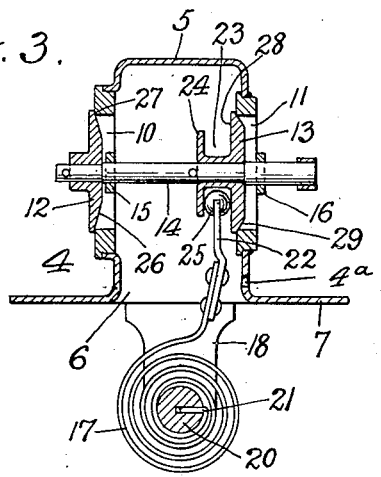
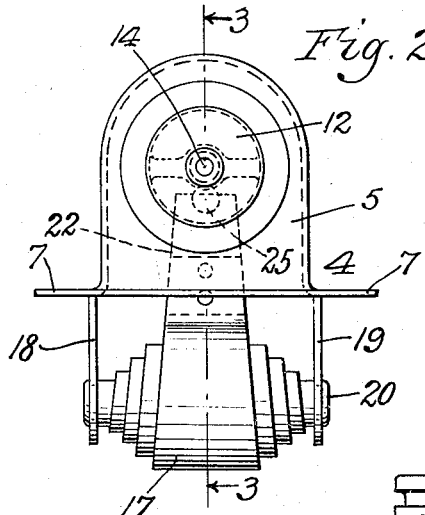
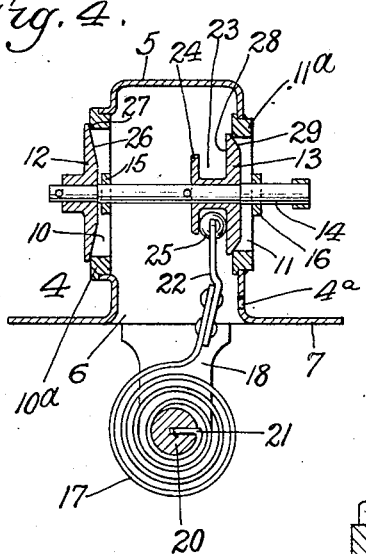
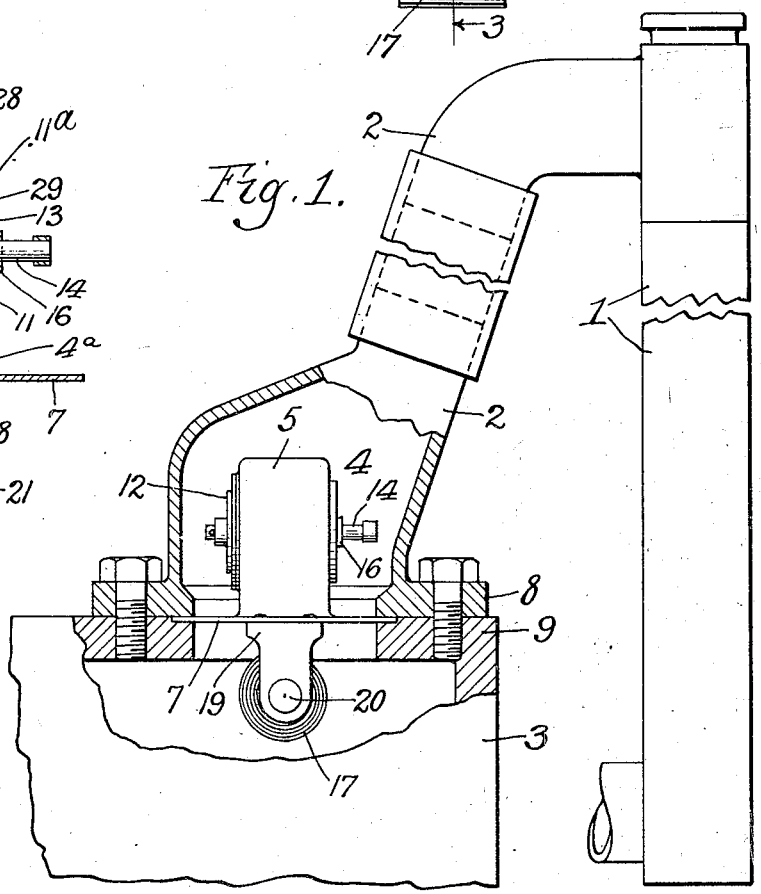
Inventor
James K. Lund
by Parker & Carter
Attorneys.

Patented Oct. 27, 1942

2,300,299

UNITED STATES PATENT OFFICE 2,300,299

THERMOSTAT CONTROLLED VALVE

James K. Lund, Oak Park, Ill., assignor to The Dole Valve Company, Chicago, Ill., a corporation of Illinois Application July 26, 1937, Serial No. 155,676

4 Claims. (Cl. 236—34)

This invention relates to thermostat controlled valves and has for its object to provide a new and improved device of this description. The invention has as a further object to provide a thermostat controlled valve particularly adapted to be used in the cooling system of an internal combustion engine, which prevents dirt or foreign substance in the cooling liquid from interfering with the proper operation of the valve.

The invention has as a further object to provide a thermostat controlled valve of this type which shall be relatively statically balanced at low liquid pressures, keeping the valve closed, and which will then become unbalanced and slightly unseat itself at higher pressures before the liquid temperature has risen enough to act upon the thermostatic element, and then becomes relatively dynamically balanced when the thermostat is operating in the range for which it is set.

It often happens that foreign matter such as sand or dirt lodges between the valves and the valve seats, thus causing the valves to remain partially open. This is exceedingly disadvantageous and often prevents the proper engine temperature from being attained. The invention has as a further object to insure the removal of this foreign matter and prevent this condition.

In valves of this type, wherein one valve is inside the casing and the other outside, there is unbalanced dynamic pressure on the valves when they are open. The present invention has as a further object to compensate for this unbalanced dynamic pressure.

The manufacturers of internal combustion engines have varying requirements as to temperatures which they wish to maintain in connection with their engines, these temperatures varying largely with the different manufacturers and the different conditions of use. This invention has as a further object to provide a valve construction whereby this variation may be easily and cheaply secured.

The invention has as a further object to provide a valve construction by means of which both the thermostatic action and the liquid pressure, including the static liquid pressure and the dynamic liquid pressure, can be controlled to any desired extent. The invention has as a further object to provide a valve construction having the combination of thermostatic control and pressure control.

The invention has further objects which are more particularly pointed out in the accompanying description.

Referring now to the drawing, Fig. 1 is a view showing one form of the device installed in the cooling system of an internal combustion engine;

Fig. 2 is an end view of the valve illustrated in Fig. 1;

Fig. 3 is a sectional view taken on line 3—3 of Fig. 2; and

Fig. 4 is a view similar to Fig. 3, showing more or less diagrammatically how the device may be arranged to adapt it to different pressures and temperatures.

Like numerals refer to like parts throughout the several figures.

Referring now to the drawing, I have illustrated in Fig. 1 a radiator 1 of an internal combustion engine, which is connected by a pipe 2 with the engine jacket 3 of an internal combustion engine. A valve 4 is located in the pipe 2, or at any other desired position, so that when the engine is first started up there will be not circulation of the cooling liquid through the radiator except by means of a small bleed hole 4ª through the valve, and after the engine is heated up the valve will be opened up so as to permit circulation of the cooling liquid through the radiator. In the construction illustrated the valve 4 is provided with the casing 5 which has an admission opening 6 and which is mounted in any suitable manner in the proper position. As herein shown, the casing is provided with the laterally extending flange 7 which fits in between the flange 8 of the pipe 2 and a part 9 on the engine, as clearly shown in Fig. 1. The casing 5 is also provided with two ports 10 and 11 which are of the desired size to meet the varying conditions presented. These ports are controlled by the valves 12 and 13 which are mounted on a connecting member 14, which is slidably mounted in the guides 15 and 16. A thermostat 17 is connected with the casing 5 in any suitable manner. As herein shown, the casing is provided with the projecting members 18 and 19 and there is a member 20 extending between them, and the thermostat 17 has one end 21 connected with this member 20. The other end 22 of the thermostat is connected with the valves 12 and 13. This connection is such as to compensate for the different movements of the end of the thermostat and of the valves, as the valves move in a substantially straight line, whereas the end of the thermostat moves in the arc of a circle. Any desired means of securing this adjustable connection may be provided. As herein shown, the thermostat connection is made by having the end 22 which is connected with the thermostat, project into a channel 23. As herein shown, this channel is formed between the valve 13 and the member 24 on the connecting piece 14. There is preferably a ball, preferably of bronze, 25 connected with the end 22 of the thermostat, the ball fitting in this channel 23. This provides an effective connection between the thermostat and the valves which remains effective under all conditions and which cannot be disconnected by rough handling.

One of the problems associated with the cooling system of an internal combustion engine where valves are used, is the dirt problem, that is sand or other foreign material which is always present and particles of which tend to lodge between the valve and its valve seat and thus interfere with the proper operation of the valve. This difficulty with the present device may be overcome, for example, by arranging the valves 12 and 13 so that they are rotatably mounted in any suitable manner so that as the device operates, the valves will change position with relation to their seats so as to act to dislodge any foreign material that may lodge between the valves and their seats. These valves may rotate upon the connecting piece 14, or they may be attached to it and the connecting piece rotate, or both the valves and the connecting piece may rotate. The valves may also be provided with inclined faces at the points where they engage their seats so that there will be substantially a line contact between the valves and the seats, which further prevents the lodgement of foreign material between the valves and their seats. The line contact construction may be used either when the valves are rotatably mounted, or when they are not rotatably mounted. The dirt may also be removed by slightly unbalancing the valves so that the pressure of the liquid will reduce the pressure of the valves upon the foreign material so that the liquid may easily remove it. The desired unbalancing effect may be obtained by varying the relative size of the openings.

Means may be provided for statically unbalancing the valve members so that when the liquid pressure reaches a predetermined point due to the operation of the pump, say two or three pounds, or any pressure desired, the valves will slightly open before the temperature has risen enough to act upon the thermostatic element and then become relatively dynamically balanced when the thermostatic element is operating in the range for which it is set. One means for securing this result is herein shown. The inner face of the valve 12 is inclined throughout a large portion of its area, being inclined outwardly from the center toward the periphery of the valve, and this inclined face 26 engages the seat 27. The inner face 28 of the valve 13 is substantially flat. The area of the inner face of the valve 12 is preferably slightly greater than the area of the inner face of the valve 13, so that as the pressure builds up there will be greater pressure on the valve 12, to move it to its open position, than there is on valve 13, tending to hold the valves closed, and the valves will therefore be slightly open at this predetermined pressure, as for example, three or four pounds, or any other pressure desired. This permits a small amount of liquid to flow through the valves, which dislodges any foreign material that may be between the valves and their seats. The valve 13 is provided with an inclined face 29 which is on the outside of the valve, but which engages the valve seat. When the valves are closed the liquid pressure due to the pump is not exerted on this inclined face. When the valves are opened slightly, the pressure on the inner face of the valve 13 exerts a force on this valve substantially equal to that exerted on the valve 12 and this tends to again balance the valves, thus leaving the further opening of the valves entirely to the thermostat. The valves will remain in this slightly open position until the temperature rises the proper amount, whereupon the thermostat will act to open the valves, the opening of the valves depending upon the temperature for which the thermostat is set. It will thus be seen that with this construction the valves are slightly opened by the pressure of the liquid when the pump is operating, due to the unbalanced static pressure on the two valves, and then remain in this position, being balanced by the pressures, until the temperature rises to cause the thermostat to act to open the valves.

The manufacturers of engines often desire to have their engines maintained at different temperatures and they also utilize different pressures. By means of the present construction, the valves may be arranged to take care of these different factors by properly designing the thermostat and by properly unbalancing the valves by having the openings for the valves vary in size the proper amount. If, for example, it is desired to have the engine operate at a higher temperature than that at which it is practicable to have the thermostat act, this may be secured by so unbalancing the valves that the unbalancing effect opposes the thermostat so as to delay the opening of the valves, whereas if a lower temperature is desired, the unbalancing effect can assist the thermostat in opening the valves. It will thus be seen that these various conditions can be taken care of by the present valve, due to the fact that it not only provides for temperature control, but provides for control of the pressures, both the static and the dynamic pressures of the liquid used. Fig. 4 is a sectional view more or less diagrammatically illustrating how the valve may be arranged to adapt it to the different engines of these manufacturers wherein different pressures and temperatures are required. This Fig. 4 illustrates how this may be accomplished by varying the sizes of the two openings 10 and 11. The opening 10 is shown as being larger in diameter than the opening 11 and this difference in diameter will depend upon the conditions presented and the pressures which the different engine manufacturers utilize. It will be seen that the size of these openings and hence the effective pressure area of the valves, may be varied or changed in any desired manner to get any result which the engine manufacturers may require.

In order to make this change of the sizes of the two openings 10 and 11 easily accomplished, I may provide members 10a and 11a through which the openings 10 and 11 are made, which members are separate from the remaining portion of the casing 5, so that any desired members 10a and 11a, with any desired size of openings therethrough, may be attached to the section 5 of the casing when it is known just what sizes are required to fit the device for its given use. It will thus be seen that the portions of the casing 5 may all be made up the same size and they may have the same size openings therein, and then the members 10a and 11a made up with the various size openings therein, and then assembled as the condition under which they are to be used becomes known. Further-more, the members 10a and 11a may at any time be made up with the proper openings when the conditions of use have become known.

I claim:

1. A thermostat controlled valve comprising a casing closed at the top and having an inlet opening at the bottom and two outlet openings extending through the sides of the casing to the exterior thereof and through which liquid passes in opposite directions to the exterior of the casing and valve members controlling said outlet openings and connected together, a thermostatic device connected with said valve members so as to move them when the temperature reaches a predetermined point, said casing provided with a removable valve seat surrounding one of said outlet openings, whereby said valve seat may be removed and replaced by a valve seat having an outlet of a different diameter, for adjusting the size of the opening relatively to adapt it for engines having different pressures in the cooling systems.

2. A thermostat controlled valve comprising a casing closed at the top and having an inlet opening at the bottom and two outlet openings extending through the sides of the casing to the exterior thereof and through which liquid passes in opposite directions to the exterior of the casing and valve members controlling said outlet openings and connected together, and a thermostatic device connected with said valve members so as to move them when the temperature reaches a predetermined point, the outlet openings being of different diameters so as to adapt the device for use in systems having different pressures.

3. A thermostat controlled valve comprising a casing closed at the top and having an inlet opening at the bottom and two outlet openings extending through the sides of the casing to the exterior thereof and through which liquid passes in opposite directions to the exterior of the casing and valve members for the two outlet openings, said outlet openings provided with removable valve seats so that they may be removed and replaced by valve seats having different size openings, to meet the conditions of use of the valve for varying conditions, and a thermostatic device connected with said valve members, so as to move them in response to variations in temperature of the material passing through the valve.

4. A thermostat controlled valve comprising a casing closed at the top and having an inlet opening at the bottom and two outlet openings extending through the sides of the casing to the exterior thereof and through which liquid passes in opposite directions to the exterior of the casing and removable changeable valve seat members attached to said casing in said outlet openings and surrounding said outlet openings, so that the valve can be adjusted for different conditions, and a thermostatic device for controlling said valve members.

JAMES K. LUND.